(12) United States Patent
Tan et al.

(10) Patent No.: US 9,902,071 B2
(45) Date of Patent: *Feb. 27, 2018

(54) CONTROL SYSTEM AND METHOD FOR BRAKE BLEEDING

(71) Applicant: General Electric Company, Schenectady, NY (US)

(72) Inventors: Huan Tan, Niskayuna, NY (US); John Michael Lizzi, Wilton, NY (US); Douglas Forman, Niskayuna, NY (US); Charles Burton Theurer, Alplaus, NY (US); Omar Al Assad, Niskayuna, NY (US); Romano Patrick, Atlanta, GA (US); Balajee Kannan, Niskayuna, NY (US); Yonatan Gefen, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/058,423

(22) Filed: Mar. 2, 2016

(65) Prior Publication Data

US 2017/0173795 A1 Jun. 22, 2017

Related U.S. Application Data

(60) Provisional application No. 62/269,481, filed on Dec. 18, 2015, provisional application No. 62/269,523, (Continued)

(51) Int. Cl.
*G06F 19/00* (2011.01)
*B25J 9/16* (2006.01)
(Continued)

(52) U.S. Cl.
CPC ............ *B25J 9/1697* (2013.01); *B25J 9/162* (2013.01); *B25J 9/1612* (2013.01); *B25J 9/1661* (2013.01);
(Continued)

(58) Field of Classification Search
CPC ...... B25J 13/085; B25J 19/021; B25J 9/1661; B25J 9/1612; B25J 9/1664
(Continued)

(56) References Cited

U.S. PATENT DOCUMENTS 5,673,367 A 9/1997 Buckley
8,422,741 B2 4/2013 Eggert et al.
(Continued)

FOREIGN PATENT DOCUMENTS

CN 103761737 A1 4/2014
KR 100544445 B1 1/2006

OTHER PUBLICATIONS

S.M. Haris, et al.; Position Control of a two-link satellite tracker manipulator using optical flow; Space Science and Communication 2009; Oct. 26-27, 2009; pp. 200-204.

*Primary Examiner* — Harry Y Oh
(74) *Attorney, Agent, or Firm* — Pabitra K. Chakrabarti

(57) ABSTRACT

A system is provided that includes a machine assembly, a first imaging sensor, an encoder, and one or more processors. The machine assembly is movable to actuate a brake lever of a vehicle in order to open a valve of an air brake system. The first imaging sensor is positioned to acquire two-dimensional perception information of a working environment that includes the brake lever during movement of the machine assembly towards the brake lever. The encoder detects a displacement of the machine assembly relative to a reference position of the machine assembly. The one or more processors estimate a target position of the brake lever
(Continued)

relative to the machine assembly during movement of the machine assembly based on the two-dimensional perception information and the displacement. The one or more processors drive the movement of the machine assembly towards the target position of the brake lever.

18 Claims, 5 Drawing Sheets

Related U.S. Application Data filed on Dec. 18, 2015, provisional application No. 62/269,425, filed on Dec. 18, 2015, provisional application No. 62/269,377, filed on Dec. 18, 2015.

(51) Int. Cl.

| | | |
|---|---|---|
| *B60T 15/54* | (2006.01) | |
| *H04N 7/18* | (2006.01) | |
| *H04N 5/225* | (2006.01) | |
| *G06T 7/00* | (2017.01) | |
| *B25J 13/08* | (2006.01) | |
| *B25J 19/02* | (2006.01) | |
| *B25J 11/00* | (2006.01) | |
| *B60T 7/16* | (2006.01) | |
| *B60T 15/04* | (2006.01) | |

(52) U.S. Cl.
CPC ........... *B25J 9/1664* (2013.01); *B25J 9/1694* (2013.01); *B25J 11/00* (2013.01); *B25J 13/085* (2013.01); *B25J 19/021* (2013.01); *B25J 19/023* (2013.01); *B60T 7/16* (2013.01); *B60T 15/048* (2013.01); *B60T 15/54* (2013.01); *G06T 7/004* (2013.01); *H04N 5/2253* (2013.01); *H04N 7/181* (2013.01); *Y10S 901/01* (2013.01)

(58) Field of Classification Search
USPC .......................................................... 700/245
See application file for complete search history.

(56) References Cited

U.S. PATENT DOCUMENTS

| | | | |
|---|---|---|---|
| 8,564,657 B2 | 10/2013 | Michalke et al. | |
| 8,583,313 B2 | 11/2013 | Mian | |
| 9,085,080 B2 | 7/2015 | Mian | |
| 9,186,795 B1 * | 11/2015 | Edsinger | B25J 9/1694 |
| 2008/0027580 A1 * | 1/2008 | Zhang | B25J 9/1633 |
| | | | 700/245 |
| 2009/0154769 A1 | 6/2009 | Yoon et al. | |
| 2010/0076631 A1 * | 3/2010 | Mian | G05D 1/0229 |
| | | | 701/19 |
| 2012/0004774 A1 * | 1/2012 | Umetsu | B25J 15/0009 |
| | | | 700/254 |
| 2014/0163730 A1 * | 6/2014 | Mian | B25J 9/16 |
| | | | 700/248 |
| 2015/0094855 A1 * | 4/2015 | Chemouny | G05B 19/423 |
| | | | 700/259 |
| 2015/0164361 A1 * | 6/2015 | Lunner | A61B 5/6817 |
| | | | 600/379 |
| 2016/0089789 A1 * | 3/2016 | Sato | B25J 11/005 |
| | | | 700/254 |

* cited by examiner

CONTROL SYSTEM AND METHOD FOR BRAKE BLEEDING

CROSS-REFERENCE TO RELATED APPLICATIONS

This application claims priority to U.S. Provisional Application 62/269,523; 62/269,425; 62/269,377; and 62/269,481, all of which were filed on 18 Dec. 2015, and the entire disclosures of which are incorporated herein by reference.

FIELD

The subject matter described herein relates to automated systems that bleed brakes of a vehicle, such as air brakes of a vehicle.

BACKGROUND

Some vehicles include brake systems that operate based on pressure differentials in fluid disposed in the brake systems. For example, air brakes in some vehicles (e.g., rail vehicles) may disengage when the air pressure in the air brakes is decreased. The air brakes in such vehicles may be released in certain environments in order to perform operations on the vehicles. The air brakes in rail vehicles, for example, may be disengaged while in a rail yard in order to more freely roll the rail vehicles around within the rail yard.

In order to disengage the air brakes of vehicles, a human operator may pull on a lever that opens a valve of the air brakes. The valve is opened and the air within the brake system is bled (e.g., the air flows out of the brake system) to reduce the pressure within the brake system and disengage the air brakes. Use of human operators in a rail yard, however, is not without problems. The operations taking place in a rail yard pose safety risks to the human operators. Additionally, the use of human operators can involve increased cost relative to automated systems.

But, automated systems pose problems as well. Although applicant is unaware of any automated system that can bleed air brakes of a vehicle, such an automated system that pulls on a brake lever to disengage a brake system may be unreliable due to the wide variances in the brake systems among several different vehicles. For example, different vehicles may have brake levers in different locations that may be difficult for the automated system to locate, may have brake levers that require different amounts of force to actuate, may have other components that block movement of the automated system when attempting to access and pull the brake lever, may have brake levers that become temporarily stuck, etc. These variances can make it difficult for an automated system to perform brake bleeding operations.

BRIEF DESCRIPTION

In an embodiment, a system includes a machine assembly, a first imaging sensor, an encoder, and one or more processors. The machine assembly is movable to actuate a brake lever of a vehicle in order to open a valve of an air brake system of the vehicle. The first imaging sensor is positioned to acquire two-dimensional perception information of a working environment that includes the brake lever. The first imaging sensor is configured to acquire the two-dimensional perception information during movement of the machine assembly towards the brake lever. The encoder detects a displacement of the machine assembly relative to a reference position of the machine assembly. The displacement includes at least one of position information or motion information of the machine assembly during movement of the machine assembly towards the brake lever. The one or more processors are configured to estimate a target position of the brake lever relative to the machine assembly as the machine assembly moves toward the brake lever based on the two-dimensional perception information and the displacement of the machine assembly. The one or more processors are further configured to drive the movement of the machine assembly towards the target position of the brake lever.

In another embodiment, a method includes acquiring perception information of a brake lever of a vehicle to detect a target position of the brake lever relative to a robotic arm of a machine assembly. The brake lever is actuatable to open a valve of an air brake system of the vehicle. The perception information is acquired by a first imaging sensor mounted on the robotic win. The method includes driving the robotic arm towards the target position of the brake lever to actuate the brake lever for opening the valve of the air brake system. The method also includes detecting a displacement of the robotic arm as the robotic arm moves towards the target position. The displacement information includes at least one of position information or motion information of the robotic arm. The method further includes estimating, using one or more processors, an updated target position of the brake lever based at least in part on the perception information acquired during the movement of the robotic arm and the displacement information of the robotic arm.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
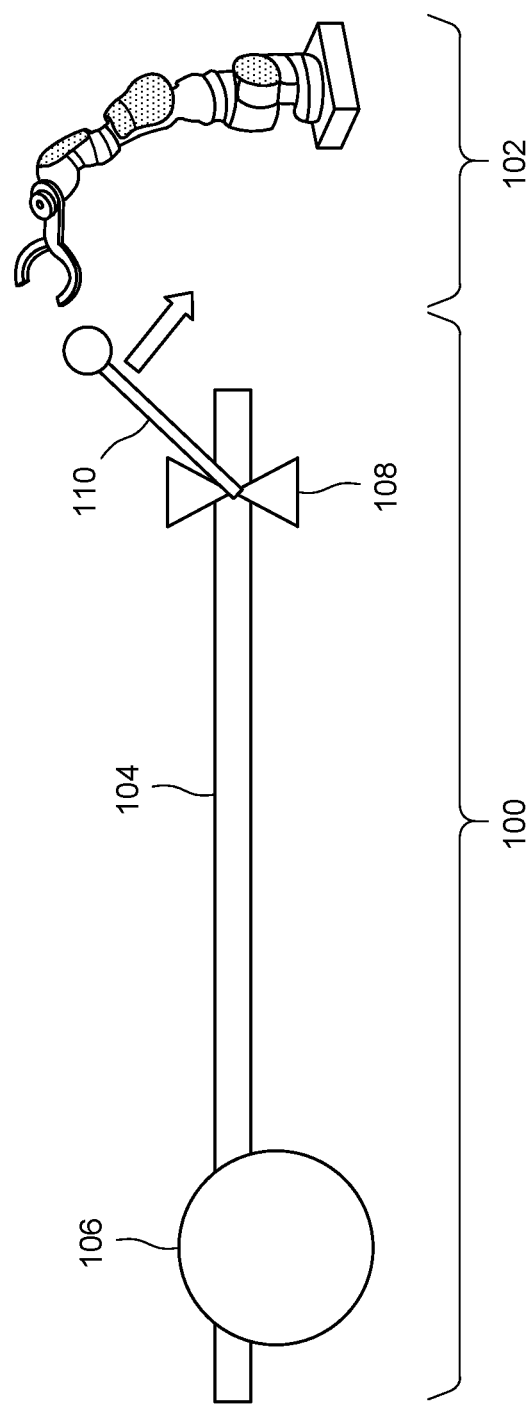
FIG. 1 schematically illustrates a brake system and a robotic control system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles and vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a brake system.

The act of bleeding a brake system, also referred to herein as brake bleeding, using an automated system may risk substantial detection errors for the automated system to locate and then actuate the target object, which may be a brake lever. For example, there may be perception errors in locating the brake lever in the working environment in addition to control errors occurring as the automated system moves towards the perceived location of the brake lever. If the error is too large, the automated system may miss the brake lever or may engage the brake lever at a wrong location or orientation that does not properly actuate the brake lever, resulting in insufficient bleeding of the brake system. Furthermore, the automated system may have to make several attempts to locate, engage, and actuate a single brake lever before the air is released from the brake system, which can consume a significant amount of time and resources.

The systems and methods described herein can be used to actuate a brake release action. An automated system implements closed loop control of a robotic arm to locate and actuate a brake lever to bleed a brake system, such as one of the systems described in U.S. Provisional Application No. 62/269,481, which was filed on Dec. 18, 2015 and is incorporated herein by reference in its entirety. For example, even with a perception error that is relatively large, such as 2-5 cm, the error decreases as the robotic arm approaches the brake lever due to closed loop feedback from one or more sensors. These sensors can include, but are not limited to, an imaging sensor installed on the robotic arm that moves the brake lever, a force and/or torque sensor installed on the robotic arm, and/or position feedback of the robotic arm (e.g., encoders that sense displacement of the arm). A computer, such as a controller, reads the sensor inputs and provides the following outputs based on the inputs: the location of the brake lever, the current position and movement of the robotic arm, and/or the forces and/or torques applied by the robotic arm (as the arm moves and actuates the brake lever). The sensors provide the outputs to the computer as the robotic arm moves, and updated information is used to revise or adjust the movement of the robotic arm towards the brake lever, reducing the error between the perceived position of the brake lever relative to the position of the robotic arm. Thus, the systems and methods described herein control the robotic arm to increase the efficiency of the brake bleeding task by reducing first attempt failures to bleed the brake system without compromising speed.

The processing speed of perception information acquired by the imaging sensor may be relatively slow, such as around 0.2 Hz. In order to synchronize the perception aspect of the system with the control aspect of the system which conveys control signals to the robotic arm, one or more embodiments described herein implement a step-wise visual servo control algorithm during the brake bleeding task. For example, a motion prediction model may be used to estimate the position of the brake lever relative to the robotic arm as the robotic arm moves towards the brake lever. The motion prediction model provides feedback for closed loop control of the robotic arm. But, since the frequency of the perception is slow, the feedback information may not be available as often as required for the motion prediction model alone to be used to accurately guide the robotic arm. In one or more embodiments, an optical-flow prediction model is used as an additional environmental information source for estimating the relative position and movement between the robotic arm and the brake lever. The estimation provided by the optical-flow prediction model increases the frequency of perception and synchronizes the perception aspect of the system with the control aspect because the estimated variables of location and/or position may be used in control calculations when the slower, but more accurate, perception information is not available.

In particular embodiments, the systems and methods described herein may be used to perform a brake-bleeding task, such as the brake-bleeding tasks described in U.S. Provisional Application Nos. 62/269,523; 62/269,425; 62/269,377; and 62/269,481, the entire disclosures of which are incorporated herein by reference. For example, the systems and methods described herein can be used generally for grasping a brake lever, such as the systems and methods described in U.S. Provisional Application No. 62/269,425, which was filed on Dec. 18, 2015 and is incorporated herein by reference in its entirety. The automated system may use feedback from one or more sensors to position a manipulator and an end-effector to grasp the break lever. These sensors may include, but are not limited to a force and/or torque sensor installed on an end-effector of the manipulator, position feedback sensors on the robotic arm (e.g., encoders that sense displacement of an arm and/or lever), a peripheral sensor, and/or the like. A computer, such as a controller, reads the sensor inputs and adjusts a position and/or orientation of the end-effector based on the sensor inputs. The controller may continually adjust in real-time the position and/or orientation of the end-effector to enable the automated system to firmly grasp the brake lever. Thereby, a technical effect of the various embodiments described herein provide for real-time planning and adjusting a position and/or orientation of the end-effector. Based on the sensor inputs the controller may generate a plurality of closed loops to control movement and/or drive the manipulator and the end-effector. The sensor inputs may be utilized by the controller as feedback information relating to the automated system and the environment (e.g., area surrounding the automated system, task space) to adjust the manipulator and/or the end-effector.

For example, as the end-effector is positioned approximate to and/or grasping the brake lever the controller may receive sensor inputs by the force and/or torque sensor corresponding to an amount of pressure (e.g., force, torque) applied to the end-effector while in contact with the brake lever. The controller may continually adjust a position and/or orientation of the end-effector until the controller validates or confirms the grasp based on the measured pressure is within a predetermined threshold of an appropriate grasp.

The systems and methods described herein can be used to validate a brake release action using feedback from one or more sensors, such as the systems and methods described in U.S. Provisional Application No. 62/269,523, which was filed on Dec. 18, 2015 and is incorporated herein by reference in its entirety. These sensors can include, but are not limited to a force and/or torque sensor installed on a robotic arm that moves a brake lever, position feedback of the robotic arm (e.g., encoders that sense displacement of the arm and/or lever), and/or acoustic measurement of the air release using one or more microphones. A computer, such as a controller, reads the sensor inputs and provides the following outputs based on the inputs: whether the brake is released (and, optionally, a confidence value or index indicative of a probability that the brake was released) and/or whether the brake was not released and (and, optionally, a confidence value or index indicative of a probability that the brake was not released). The action of pulling or pushing the brake lever can provide a direct feedback measured as an amount of lever (or rod) displacement and/or an amount of force and torque applied on the lever in several or all directions. The action of pulling or pushing the brake lever can provide an indirect feedback measured as acoustic sound of the air released via a brake valve.

The act of bleeding a brake system can be associated with a priori predicted values of these feedbacks. For example, the sensor feedback can be monitored while attempting to bleed the brake systems of a large sample of vehicles. Based on the sensor feedbacks from this sample and whether the brake systems were or were not released, the probabilities of whether a brake system on other vehicles is or is not released can be determined. For example, the measured difference between the sensor feedbacks from the sample and from a current brake system can be used to validate the brake release and provide the confidence interval (e.g., the confidence value or index). The use of the confidence value or index is used to provide an accurate estimation or validation of whether the brake system was bled. Because there are no known sensors on rail cars to indicate whether an air brake has been released, the systems and methods described herein meet a need by determining whether the air brake is released.

Embodiments may also include systems and methods for communicating information from a control system (e.g., a robotic control system) to an operator of the control system, such as the systems and methods described in U.S. Provisional Application No. 62/269,377, which was filed on Dec. 18, 2015 and is incorporated herein by reference in its entirety. The operator may be a human operator or another system. In some embodiments, the other system may be a supervisor system that is configured to supervise a plurality of control systems or the other system may be similarly configured or may be identical to the control system.

The information communicated to the operator from the control system may be information relating to a task that is being performed by the control system, such as tasks described herein. The communication may be through a system interface that includes hardware and software for communicating the information. For example, the system interface may include a collection of different physical units, such as user displays, light sources, and audio-generating devices (e.g., speakers, horns, and the like). The information may be in the form of visual signals, audible signals, or tactile signals.

FIG. 1 schematically illustrates a brake system 100 and a robotic control system 102 according to one embodiment. The brake system 100 may be disposed onboard one or more vehicles, such as rail vehicles, automobiles, or the like. The brake system 100 operates on a pressure differential within one or more conduits 104 of the brake system 100. When the pressure of a fluid, such as air, in the conduits 104 is above a designated threshold or when the pressure increases by at least a designated amount, the brake system 100 engages brakes 106 (e.g., air brakes) of the brake system 100. Although only one brake 106 is shown in FIG. 1, the brake system 100 may include several brakes 106.

The conduit 104 is connected with a valve 108 that closes to retain the fluid within the conduit 104. The valve 108 can be opened to release (e.g., bleed) the fluid out of the conduit 104 and brake system 100. Once the pressure of the fluid in the conduit 104 and brake system 100 drops by or below a designated amount, the brakes 106 of the brake system 100 release. The vehicle having the brake system 100 may then freely roll with the brakes 106 being disengaged.

The valve 108 can be actuated by moving a brake lever 110. The brake lever 110 can be pulled or pushed (e.g., actuated) to open the valve 108. Releasing the brake lever 110 may cause the valve 108 to close. For example, the brake lever 110 may move under the force of a spring to return to a starting position and force the valve 108 closed. In another embodiment, the brake lever 110 may require an operator or an automated system to return the brake lever 110 to the starting position to close the valve 108 after bleeding the brake system 100.

The brake system 100 may be mounted on one vehicle of a vehicle system that includes a plurality of interconnected vehicles for traveling together along a route. Optionally, all or at least most of the vehicles in the vehicle system include a brake system similar to the brake system 100. Prior to the vehicle system starting to move from a stationary position, the brake systems of each of the vehicles need to be bled. In accordance with one embodiment of the inventive subject matter described herein, the robotic control system 102 is mobile and is configured to move among the vehicle system from vehicle to vehicle. At each vehicle, the robotic control system 102 recognizes and locates the applicable brake lever 110, moves toward the brake lever 110, engages the brake lever 110, and actuates the brake lever 110 to bleed the brakes. Once it is determined that the valve 108 has been opened to release the brakes 106, the robotic control system 102 disengages the brake lever 110 and moves to the next vehicle in the vehicle system to repeat the brake bleeding process. The robotic control system 102 may implement one or more follow up actions responsive to determining that the brake system 100 has or has not been disengaged, such as by communicating with one or more human operators, attempting to release the brake system 100 again, identifying the vehicle having the brake system 100 as requiring inspection, maintenance, or repair, etc.

Figure 2:
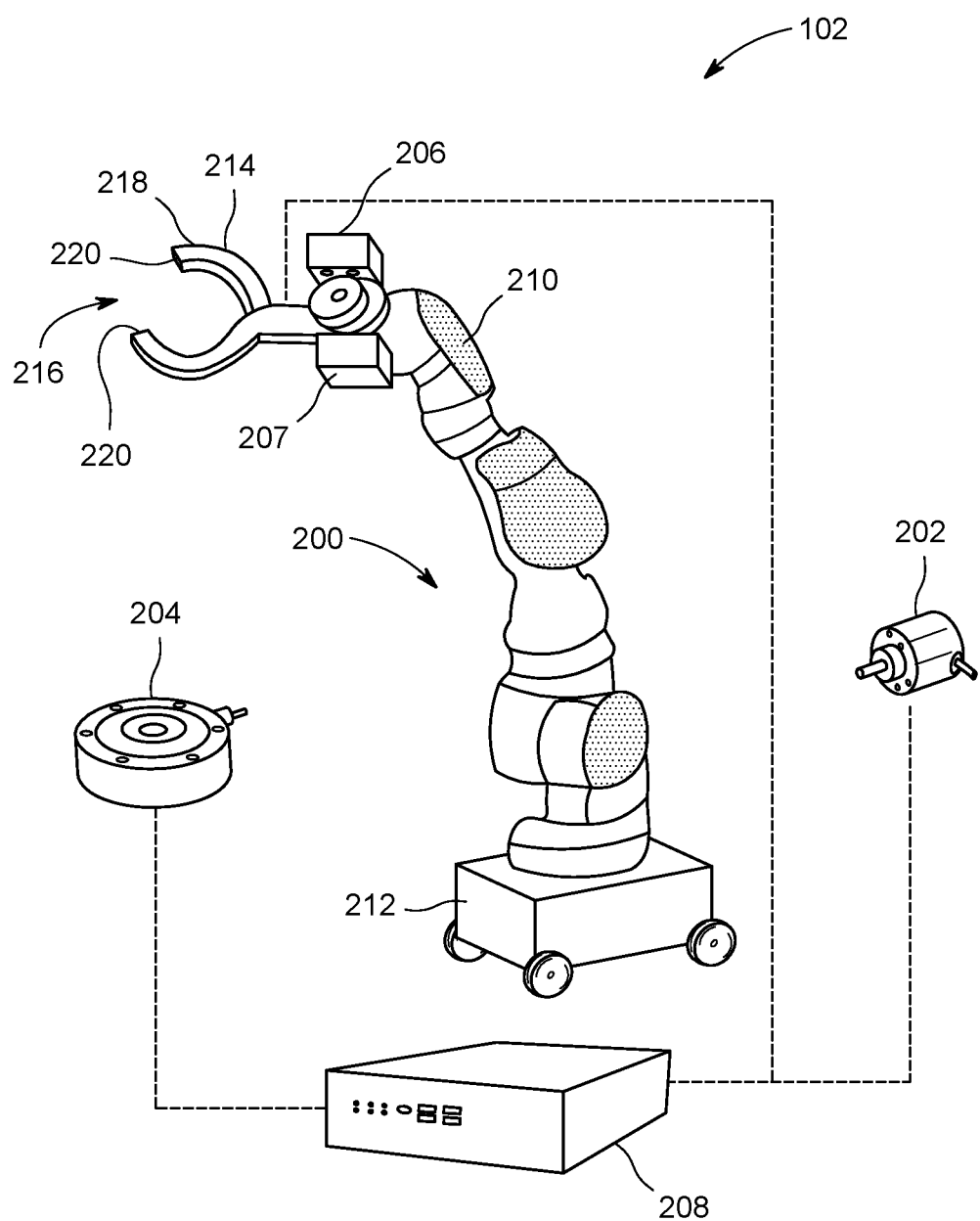
FIG. 2 illustrates one embodiment of the robotic control system shown in FIG. 1.

FIG. 2 illustrates one embodiment of the robotic control system 102 shown in FIG. 1. The control system 102 includes a robotic machine assembly 200 that moves under the direction of a controller 208. In the illustrated embodiment, the assembly 200 represents a robotic arm 210 (also referred to herein as arm 210) that is mounted on a mobile base 212. The mobile base 212 transports the arm 210 from vehicle to vehicle. The arm 210 moves in multiple different directions relative to the base 212 under the control of the controller 208. The controller 208 drives the arm 210 to move toward the corresponding brake lever 110 (shown in FIG. 1) to engage (for example, grasp) the brake lever 110 and actuate the brake lever 110 to release the brakes 106 (FIG. 1) of the vehicle. For example, the controller 208 may convey commands in the form of electrical signals to actuators, motors, and/or other devices of the assembly 200 that provide a kinematic response to the received commands.

The controller 208 represents hardware circuitry that includes, represents, and/or is connected with one or more processors (e.g., microprocessors, field programmable gate arrays, integrated circuits, or other electronic logic-based devices). The controller 208 may include and/or be communicatively connected with one or more memories, such as computer hard drives, computer servers, etc. The controller 208 may be mounted on the robotic machine assembly 200 or, alternatively, may be remote from the robotic machine assembly 200. The controller 208 is communicatively coupled with the assembly 200 by one or more wired and/or wireless communication links that allow the controller 208 to dictate how and where the assembly 200 moves. Although illustrated as having single case in FIG. 2, the one or more processors of the controller 28 may be located in at least two housings or cases in an alternative embodiment.

The control system 102 includes one or more sensors 202, 204, 206, 207 that detect operational data parameters of the assembly 200 and/or the brake system 100 (shown in FIG. 1). These data parameters are communicated to the controller 208, which analyzes the parameters to determine the location of the brake lever 110 (shown in FIG. 1) relative to the assembly 200, to generate a motion trajectory for the robotic arm 210 towards the brake lever 110 while avoiding obstacles, and to drive the robotic arm 210 along the defined motion trajectory to the brake lever 110 to actuate the brake lever 110. The control system 102 includes an encoder sensor 202 that converts rotary and/or linear positions of the robotic arm 210 to one or more electronic signals. The encoder sensor 202 can include one or more transducers that generate the electronic signals as the robotic arm 210 moves. The electronic signals can represent displacement and/or movement of the arm 210, such as a position, velocity, and/or acceleration of the robotic arm 210 at a given time. The position of the arm 210 may refer to a displaced position of the arm 210 relative to a reference position of the arm 210, and the displacement may indicate how far the arm 210 has moved from the reference position. The reference position may be a starting position of the arm 210 before the arm 210 begins movement towards a corresponding brake lever in a brake bleeding task.

The robotic arm 210 includes an end-effector 214 at a distal end 216 of the arm 210 (relative to the mobile base 212). The end-effector 214 is configured to mechanically engage the brake lever 110 (shown in FIG. 1) during the brake bleeding process to physically actuate the lever 110. For example, the end-effector 214 may grasp the brake lever 110 to hold the lever such that translation of the arm 210 moves the brake lever 110. In the illustrated embodiment, the end-effector 214 has a jaw 218 that is controllable to adjust the width of the jaw 218 between two fingers 220 that are movable relative to each other. The jaw 218 may be controlled (e.g., by the controller 208) for the fingers 220 to engage and at least partially enclose the brake lever 110.

The robotic control system 102 includes a first imaging sensor 206 and a second imaging sensor 207. In an embodiment, both the first and second imaging sensors 206, 207 are installed on the robotic arm 210 of the machine assembly 200. Thus, the first and second imaging sensors 206, 207 are configured to move with the arm 210 relative to the brake lever 110 (shown in FIG. 1) and to the mobile base 212. The imaging sensors 206, 207 move towards the brake lever 110 as the arm 210 moves toward the brake lever 110, and the imaging sensors 206, 207 are proximate to the brake lever 110 when the end-effector 214 engages the brake lever 110. The first and second imaging sensors 206, 207 may be mounted on or at least proximate to the end-effector 214, such that the field of view of each of the imaging sensors 206, 207 encompasses at least a portion of the end-effector 214. In an alternative embodiment, at least one of the imaging sensors 206, 207 are mounted to the mobile base 212 or another component of the robotic machine assembly 200 other than the robotic arm 210, such that one or both of the imaging sensors 206, 207 do not move with the robotic arm 210.

The first imaging sensor 206 acquires two-dimensional ("2D") perception information of the working environment of the arm 210, which includes the brake lever 110. The first imaging sensor 206 may be a camera that operates in the visual and/or infrared wavelengths. In an embodiment, the first imaging sensor 206 is a mono camera that includes one or more lenses in a single location, as opposed to a stereo camera having lenses that are spaced apart laterally from each other. In an alternative embodiment, however, the first imaging sensor 206 may be a stereo camera. The 2D perception information provides images of the brake lever 110. Since the first imaging sensor 206 is mounted on the movable robotic arm 210, the representation of the brake lever 110 in the images will change as the robotic arm 210 moves relative to the brake lever 110. For example, as the arm 210 and the imaging sensor 206 move towards the brake lever 110, the size, orientation, and clarity of the brake lever 110 in subsequent images changes relative to preceding images. The size and clarity will increase, and the orientation of the brake lever 110 in the images will depend on the trajectory of the robotic arm 110 along the approach. The imaging sensor 206 is used to detect the brake lever 110 in the working environment and estimate the pose of the brake lever 110 (e.g., the six-dimensional pose of the brake lever 110).

The second imaging sensor 207 acquires three-dimensional ("3D") perception information of a working environment of the arm 210. The 3D perception information may be a map or model of the working environment, including the brake lever 110 therein, that is generated by the second imaging sensor 207. Alternatively, the 3D perception information acquired by the second imaging sensor 207 may be raw data (such as red, green, blue (RGB) data and depth data) that is conveyed to another device (such as the controller 208 or a remote device) for processing in order to map or model the working environment. The map or model of the working environment may be a point-based cloud that uses points to represent coordinates in a 3D space. The 3D perception information may be used to measure the distance between the sensor 207 (and the robotic arm 210) relative to the brake lever 110 at a given time. The 3D perception information may also be used to measure the distance between the sensor 207 and various obstacles between the robotic arm 210 and the brake lever 110 that should be avoided during movement of the robotic arm 210 towards the brake lever 110. The second imaging sensor 207 may be a peripheral 3D range sensor. More specifically, in an embodiment, the second imaging sensor 207 may be a laser scanner that projects a line of laser points and rotates or moves the line in the environment to scan the working environment.

In an embodiment, the first imaging sensor 206 (referred to herein as "camera" 206) is configured to acquire the 2D perception information at relatively high frequencies or acquisition rates, such as between 10 Hz and 40 Hz or, more specifically, between 25 Hz and 35 Hz. The second imaging sensor 207 (referred to herein as "laser scanner" 207) may acquire the 3D perception information at relatively low frequencies or acquisition rates compared to the camera 206, such as between 0.05 Hz and 5 Hz, or, more specifically, between 0.1 Hz and 1 Hz. The frequencies at which the camera 206 and the laser scanner 207 acquire the respective perception information may account for both data acquisition and at least some data processing. Thus, for a frequency of 0.2 Hz for the laser scanner 207 to acquire the 3D perception information, updated 3D perception information is provided every 5 seconds, which may include processing time to update the map or model of the working environment. The camera 206 is faster than the laser scanner 207 and is able to refresh or update the 2D perception information at a fraction of the time that it takes to update the 3D perception information acquired by the laser scanner 207. For example, a frequency of 25 Hz has a refresh rate of once every 0.04 seconds. However, the 3D perception information acquired by the laser scanner 207 is more detailed and has a higher clarity than the 2D perception information acquired by the camera 206. Therefore, the 3D perception information provides a more accurate and precise representation of the brake lever 110 (and any obstacles between the brake lever 110 and the robotic arm 210) than the 2D perception information.

Although the illustrated embodiment includes both the camera 206 and the laser scanner 207, in an alternative embodiment, the robotic control system 102 only includes the camera 206 and therefore does not acquire 3D perception information of the working environment. In such an alternative embodiment, at least some of the 2D perception information acquired by the camera 206 as the robotic arm 210 moves toward the brake lever 110 is conveyed to a processing device, such as the controller 208 or a remote processor (e.g., via a communication interface of the control system 102), in order for the processing device to perform more advanced analysis on the image data to generate 3D perception information based on the 2D image data. Such advanced analysis may result in the 3D perception information having an acquisition rate or frequency that is similar to the frequency of the laser scanner 207. Thus, whether the 3D perception information is acquired via the laser scanner 207 or by performing advanced analysis on the 2D perception information acquired by the camera 206, the acquisition rate of the 3D perception information still lags behind the acquisition rate of the 2D perception information.

The control system 102 can include a force sensor 204 that detects forces and/or torques applied by the arm 210 to the brake lever 110. The force sensor 204 may communicate electronic signals to the controller 208 that represent the sensed forces and/or torques applied by the arm 210. The sensed forces and/or torques may represent forces applied by the jaw 218 of the end effector 214 on the brake lever 110. The sensed forces and/or torques may also represent torques applied at various joints of the arm 210 for moving and maneuvering the arm 210. Optionally, the control system 102 may include one or more additional or other sensors. For example, the control system 102 may include an acoustic sensor that detects sounds generated during actuation of the brake lever 110 to determine whether the brake lever 110 has been actuated to release the brake system 100.

Figure 3:
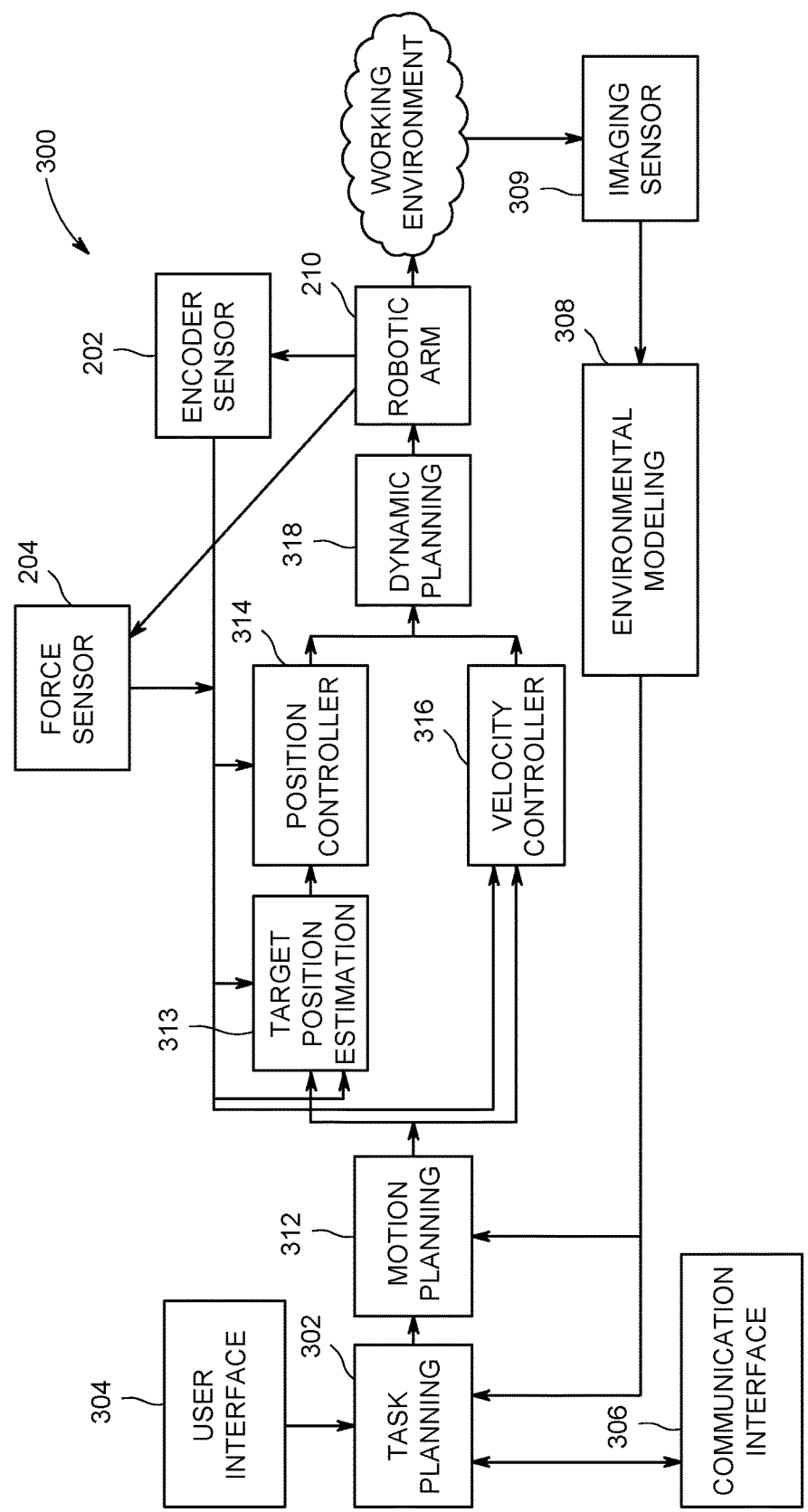
FIG. 3 illustrates a block diagram of the robotic control system according to one embodiment.

FIG. 3 is a block diagram 300 of the robotic control system 102 (shown in FIG. 1) according to one embodiment. The block diagram 300 illustrates how the devices of the control system 102 interact to automatically locate and engage a brake lever to bleed the brakes of a vehicle. A task planning processor 302 receives a task for the control system 102 to perform, such as to bleed the brakes of all or a selection of vehicles of an identified vehicle system. The task may be received from either a user interface 304 or a communication interface 306. The task may be input by an operator using the user interface 304 (for example, a graphical user interface) which may include a touchpad, a touchscreen, keys, buttons, knobs, or the like. The task alternatively may be received via the communication interface 306 from a remote operator or system. The communication interface 306 may operate based on a wireless communication protocol. In addition to sending tasks to the task planning processor 302, the user interface 304 and/or the communication interface 306 may be used by the control system 102 to send outgoing messages to an operator or another system. The outgoing messages may include status updates, warnings and other alerts, and the like.

The task planning processor 302 plans the performance of the designated task by scheduling task primitives. The task primitives may be a sequence of sub-tasks, such as move machine assembly 200 (shown in FIG. 2) to vehicle, extend arm 210 toward brake lever 110 (FIG. 1), grasp brake lever 110, pull brake lever 110, verify brakes 106 (FIG. 1) are released, push brake lever 110, release brake lever 110, retract arm 210, and the like.

An environmental modeling processor 308 describes the working space or environment of the robotic arm 210. The environmental modeling processor 308 receives sensory perception information from an imaging sensor 309. The imaging sensor 309 may be the laser scanner 207 and/or the camera 206. For example, the environmental modeling processor 308 may receive both the 2D perception information from the camera 206 and the 3D perception information from the laser scanner 207. The environmental modeling processor 308 analyzes the perception information to construct a point cloud-based map of the working environment. In an embodiment, the 3D perception information acquired by the laser scanner 207 is used to construct the point cloud-based map in order for the map to provide relatively high precision. The environmental modeling processor 308 may use the constructed map to identify a predicted location of the brake lever 110, as well as locations of any obstacles between the arm 210 and the brake lever 110. For example, a first set of points in the point cloud-based map may be associated with the brake lever 110, a second set of points may be associated with an obstacle, and a third set of points may be associated with free space. The output of the environmental modeling processor 308, such as the predicted location of the brake lever 110, may be communicated to the task planning processor 302 and/or to a motion planning processor 312. For example, the 2D perception information from the camera 206 and/or the 3D perception information from the laser scanner 207 may be provided as closed-loop feedback to the task planning processor 302 after the robotic arm 210 has started moving toward the brake lever 110, and the perception information is used to validate that the task is complete (for example, the brakes have been released).

The motion planning processor 312 is configured to determine a smooth and collision-free motion trajectory in the working environment for the robotic arm 210 to extend towards and actuate the brake lever 110. The motion planning processor 312 receives the position of the brake lever 110 and the positions of any obstacles from the environmental modeling processor 308. The motion planning processor 312 analyzes the received information to generate the motion trajectory as a sequence of via-points that define a path for the arm 210 towards the lever 110. Each via-point may be computed with temporal information and motion information (including position, velocity, and acceleration) of the arm 210 at each via-point. The motion trajectory may be computed by combining attraction to the position of the brake lever 110 in the three-dimensional field and repulsion from the positions of the obstacles.

In order to reduce the error between the arm 210 and the brake lever 110 as the robotic arm 210 moves along the motion trajectory, the motion planning processor 312 is configured to revise the motion trajectory based on updated positions of the brake lever 110 and the obstacles received from the environmental modeling processor 308 during movement of the arm 210. The motion trajectory may be updated based on received perception information from the imaging sensor 309 (e.g., 3D perception information from the laser scanner 207). Optionally, the motion planning processor 312 may generate a revised motion trajectory periodically, such as once every second, once every two seconds, or once every five seconds. Planning in the motion trajectory may be limited to the succeeding ten or so via-points to avoid unnecessary computing for each revised motion trajectory. By revising the motion trajectory during movement of the arm 210 towards the lever 110, the robotic control system 102 (shown in FIG. 1) provides closed-loop feedback and control to increase the precision of the arm 210 relative to the brake lever 110.

A target position estimation processor 313 is used to estimate the position of the brake lever 110 relative to the position of the robotic arm 210 as the arm 210 moves towards the brake lever 110. For example, the frequency or acquisition rate at which the 3D perception information acquired by the laser scanner 207 is updated may be significantly slower than the control speed of the robotic control system 102 that controls the movement of the robotic arm 210. The slow acquisition rate of the perception information could slow the entire control system 102 to a functional speed that is unacceptable. For example, without efforts to increase the speed of perception, the robotic control system 102 may be inefficiently slow at the brake bleeding task. In an embodiment, the perception rate is increased by estimating the position of the brake lever 110 (referred to herein as the target position) with respect to the robotic arm 210 using a motion model (e.g., an optical-flow prediction model). Then, in each feedback loop, the estimated target position is used as a reference input in a control calculation used to generate a control signal for driving the robotic arm 210. The estimation increases the perception rate in order to synchronize the perception aspect of the robotic control system 102 with the control aspect of the control system 102, such that the control aspect is not hindered by the slower perception aspect. As a result, the robotic control system 102 may perform the brake bleeding task more efficiently at a greater speed.

The target position estimation processor 313 may be configured to estimate the target position during time periods that more accurate and precise 3D perception information is not available, due to the slower acquisition rate of the 3D perception information. For example, when updated 3D perception information is available, such information is regarded as a reference for correcting errors due to imprecise estimation of the target position and/or control errors. But, in the time periods between receipt of 3D perception information, which could be between 1 and 15 seconds, for example, the robotic arm 210 is moving relative to the brake lever 110, so relying on outdated 3D perception information alone may result in large errors that cause the robotic arm 210 to miss the brake lever 110, improperly engage the brake lever 110, contact an obstacle, or otherwise deviate from a true, unobstructed path to the brake lever 110. Therefore, the estimation of the target position during these time periods provides additional perception information that supports the movement of the robotic arm 210 to continue moving towards the actual brake lever 110, such as by being used to revise the motion trajectory as the robotic arm 210 moves. Although the estimation using 2D images acquired by the camera 206 is less precise than the 3D perception information, once updated 3D perception information is received such data is used to correct errors that may accrue due to the estimation.

The target position estimation processor 313 may estimate the target position of the brake lever 110 according to an optical-flow prediction model. In an embodiment, the target position estimation processor 313 uses filtering technique referred to as a Kalman filter, or more specifically as an extended Kalman filter. Generally, the Kalman filter uses a series of measurements observed over time to produce estimates of unknown variables that may be more precise than those based on a single measurement alone. More specifically, the Kalman filter operates recursively on streams of input data containing noise and other inaccuracies to estimate the underlying system state.

In an embodiment, the target position estimation processor 313 receives as inputs 2D perception information of the brake lever 110 in the working environment from the camera 206 and motion and position information (referred to as displacement information) of the robotic arm 210 from the encoder sensor 202. Based, at least in part, on the images acquired by the camera 206 at different times as the robotic arm 210 moves toward the brake lever 110, the target position estimation processor 313 can estimate the 3D position of the brake lever 110 at a rate that is significantly faster than the acquisition rate of the 3D perception information from the laser scanner 207. Additional inputs used in the calculation include the estimated target position at a previous timing step (e.g., the preceding timing step), and optical flow information (such as weighted averages, uncertainties, or the like).

The target position estimation processor 313 estimates the target position in a two-step sequence, including a prediction stage and a correction stage. In the prediction stage, the target position estimation processor 313 analyzes received 2D perception information and displacement information of the robotic arm 210 to produce an estimate of the current target position at a first time, along with an uncertainty value, which may account for noise and other inaccuracies. As the robotic arm 210 and the camera 206 move relative to the brake lever 110, a subsequent estimation of the target position is generated by the target position estimation processor 313. These estimates are updated using a weighted average, with more weight being given to estimates with higher certainty, such as estimates taken later in time when the camera 206 is more proximate to the brake lever 110. Even though the camera 206 may be a mono camera that acquires 2D images, the movement of the camera 206 over time provides an optical flow that is used to estimate a 3D position of the brake lever 110. In an alternative embodiment, the 3D position of the brake lever 110 may be acquired using a stereo camera that provides depth data using two spaced-apart lenses, instead of by using the mono camera 206. The stereo camera may be mounted on the mobile base 212 (shown in FIG. 2) of the robotic machine assembly 200, since the stereo camera does not require movement to generate depth data.

In the correction stage, the target position of the brake lever 110 relative to the robotic arm 210 is detected based on the 3D perception information acquired by the laser scanner 207 (or another imaging sensor that is more precise than the camera 206). For example, as the optical-flow-based estimates of the target position using the 2D perception information from the camera 206 tend to drift away from the actual target position due to accumulating error, the laser scanner measurement should pull the target position estimate back towards the actual position of the brake lever 110 in the working environment. The output of the target position estimation, the estimated target position, may be used to update the motion trajectory for the robotic arm 210. For example, the target position estimation processor 313 may convey the estimated target position to the motion planning processor 312 as an input for revising the motion trajectory, or the target position estimation processor 313 may revise the motion trajectory using the estimated target position. In an alternative embodiment, the correction stage may be based on 3D perception information acquired from a source other than the laser scanner 207. For example, the 2D perception information acquired by the camera 206 may be conveyed to a processing device, such as the controller 208 (shown in FIG. 2) or a remote processing device, which analyzes the 2D perception information using advanced processing techniques (e.g., segmentation or the like) to generate 3D perception information based on the 2D image data.

A position controller 314 receives the motion trajectory from the motion planning processor 312 and/or from the target position estimation processor 313. The position controller 314 analyzes the motion trajectory and generates position driving signals for the robotic arm 210 based on the motion trajectory. The driving signals control the arm 210 to follow the path defined by the motion trajectory. For example, the driving signals are configured to control movement of the arm 210 such that the arm 210, or a component thereof, passes through the designated via-points at the designated times with little error between the actual positions of the arm 210 and the desired positions (at the via-points). The position controller 314 optionally may use a control loop feedback mechanism, such as a proportional-integral-derivative (PID) controller, to reduce the error between the actual measured positions of the arm 210 and the desired positions at corresponding designated via-points. For example, the position controller 314 may adjust the process through the use of a manipulated variable to reduce the error.

A velocity controller 316 also receives the motion trajectory from the motion planning processor 312. The velocity controller 316 analyzes the motion trajectory and generates velocity driving signals for the robotic arm 210 based on the motion trajectory. The velocity driving signals control the velocity and acceleration of the arm 210 as the arm 210 is driven to follow the path defined by the motion trajectory. The velocity controller 316 may be configured to reduce error by using the computed error between the actual measured position of the arm 210 and the desired position at a designated via-point to generate a compensation signal. The velocity controller 316 uses both a desired velocity that is designated in the motion trajectory and the compensation signal to generate a velocity driving signal in order to control the velocity of the arm 210 to reduce the computed error. Although described separately, the position controller 314 and the velocity controller 316 may be combined in a unitary device hardware, such as components of the controller 208 (shown in FIG. 2).

A dynamic planning processor 318 receives the position driving signals from the position controller 314 and the velocity driving signals from the velocity controller 316. The dynamic planning processor 318 analyzes the position and velocity driving signals to generate torques on various joints of the robotic arm 210 to drive the motion of the arm 210. The dynamic planning processor 318 may generate the torques using a robotic dynamics model. In addition to, or instead of, using the position and velocity driving signals, the dynamic planning processor 318 may analyze the desired via-points in the motion trajectory to generate the torques. In an embodiment, the dynamic planning processor 318 provides hybrid motion and force planning that plans the motion of the arm 210 and forces applied by the arm 210 (for example, forces applied on the brake lever 110) simultaneously. For example, one torque generated by the dynamic planning processor 318 may be conveyed to a joint between two linear segments of the arm 210 to control the relative angle between the two linear segments, and a second torque may be conveyed concurrently to the end-effector 214 (shown in FIG. 2) to control the width of the jaw 218 (FIG. 2).

The dynamic planning processor 318 is configured to receive feedback from one or more sensors during movement of the arm 210, and adjusts the generated torques based on the feedback. For example, the dynamic planning processor 318 may receive position and velocity feedback from the encoder sensor 202 that is used to determine real-time locations of the arm 210. Force feedback may be provided, at least in part, by the force sensor 204. For example, based on an identified type of brake system 100 (shown in FIG. 1) and brake lever 110 (FIG. 1), the dynamic planning processor 318 may determine an expected amount of force and/or torque necessary to actuate the brake lever 110. If the force sensor 204 provides feedback that the arm 210 is required to apply a force and/or torque to the brake lever 110 that exceeds the expected amount by designated value or percentage, the dynamic planning processor 318 identifies a potential problem and takes corrective action. The corrective action may be to control the arm 210 to release the brake lever 110, return to a starting position, and then start the brake release process again by identifying the position of the brake lever 110. The additional force required to actuate the brake lever 110 may be due to misalignment, so starting the brake release task over again may yield better alignment between the arm 210 and the lever 110. The corrective action also may include emitting an audible and/or visual alert, communicating a notification to a remote operator via the communication interface 306, or the like.

Although the block diagram 300 illustrates the task planning processor 302, the motion planning processor 312, the environmental modeling processor 308, the target position estimation processor 313, and the dynamic planning processor 318 as separate components, one or more of these processors 302, 312, 308, 313, and 318 may be combined in a single processing device, such as the controller 208 (shown in FIG. 2). For example, at least some of the processors 302, 312, 308, 313, and 318 may be embodied in a single physical processor within the controller 208, or may be embodied in two or more physical processors within the controller 208. Alternatively, at least some of the processors 302, 312, 308, 313, and 318 may be contained in separate devices, such that one or more of the processors 302, 312, 308, 313, and 318 are contained in one controller (for example, controller 208), and at least one other of the processors 302, 312, 308, 313, and 318 is contained in a different controller. It is recognized that one or more processors perform the information processing of the robotic control system 102 during the brake release procedure.

Figure 4:
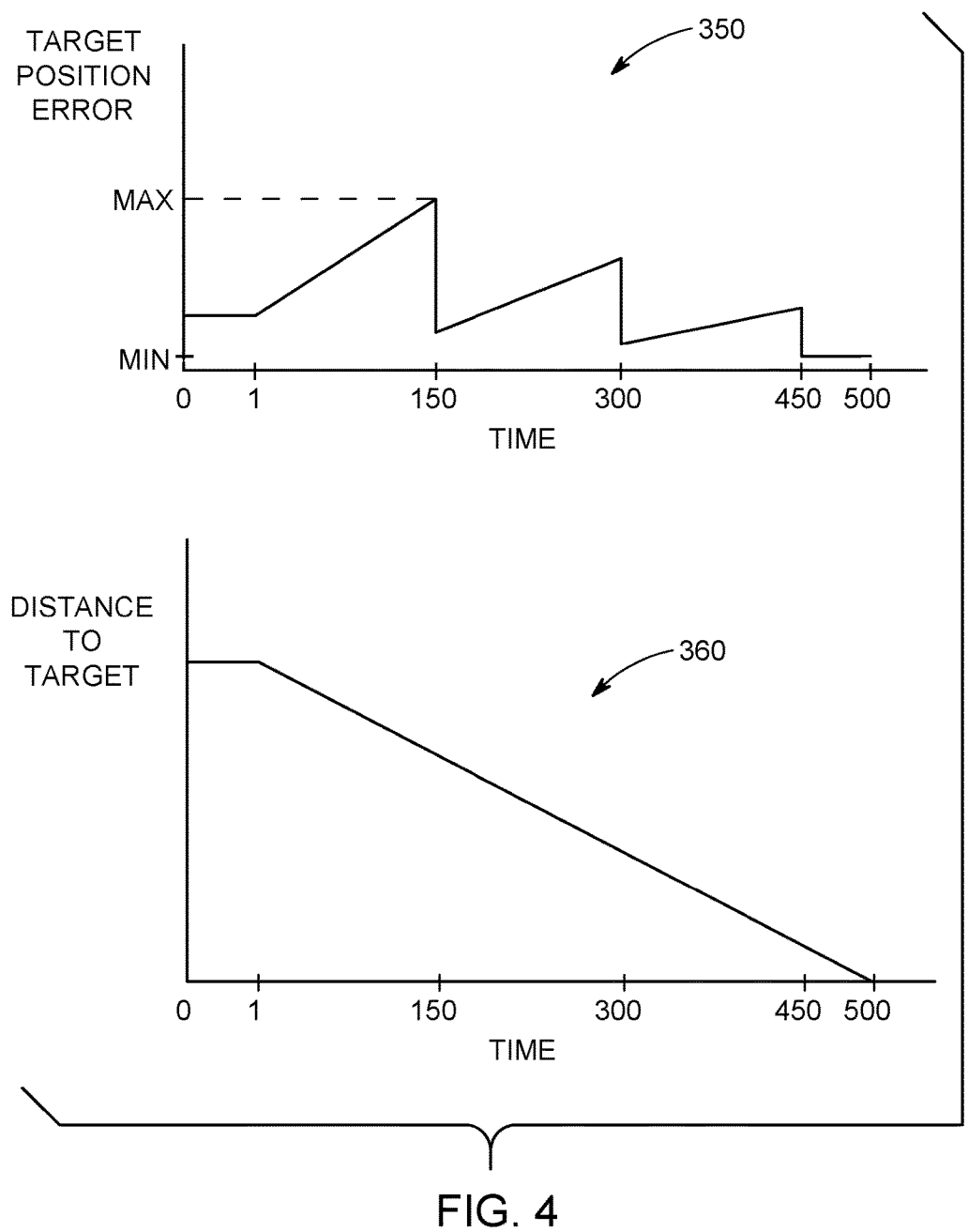
FIG. 4 depicts a first graph showing target position error of the robotic control system over time during a brake bleeding task and a second graph showing distance to target of the robotic control system over time during the brake bleeding task.

FIG. 4 depicts a first graph 350 that shows target position error of the robotic control system 102 over time during a brake bleeding task and a second graph 360 that shows distance to target of the robotic control system 102 over time during the same brake bleeding task according to an embodiment. The graphs 350, 360 are meant to illustrate how the control system 102 may estimate the target position of the brake lever as the robotic arm moves towards the brake lever. The time includes a range of 1-500 frames. Each frame may be a fraction of a second. The entire approach of the robotic arm to the brake lever may take between 1 and 30 seconds, such as between 5 and 15 seconds. The robotic arm of the control system 102 does not start moving towards the target (e.g., the brake lever) until time 1. At time 1, the distance to the target is greatest, and the target position error is at a first, non-zero error value. From time 1 to 150, as the robotic arm moves, the control system 102 estimates the target position of the brake lever using an optical flow prediction model. For example, the control system 102 may predict the location of the target position using 2D perception information acquired by the camera 206 (shown in FIG. 2) combined with displacement information of the robotic arm received from the encoder sensor 202 (FIG. 2). Since the predictions are not as precise as 3D perception information acquired by the laser scanner 207 (FIG. 2), target position errors begin to accumulate. The target position errors may account for both perception errors in estimating the actual position of the brake lever and also control errors in following the generated motion trajectory. The accumulation of errors causes the target position error in graph 350 to rise to the max level at time 150.

In the graph 350, the control system 102 receives updated 3D perception information at times 150, 300, and 450. The target position of the brake lever that is calculated using the 3D perception information is used as a reference to mitigate the accumulated errors. For example, the error in graph 350 drops considerably at time 150 due to the receipt of the more precise 3D perception information. Updated 3D perception information is not received again until time 300, and then is not received again until time 450. Therefore, in the periods of time from 150 to 300 and from 300 to 450, the control system 102 may predict the location of the target position using optical flow based on 2D perception information acquired by the camera 206 combined with displacement information of the robotic arm received from the encoder sensor 202. The error during these periods of time still rises, but the rise has a reduced slope and the error does not reach the max position again. For example, the error during the period from 150 to 300 is less than the error in the period 1 to 150 because the robotic arm is getting closer to the brake lever, so the perception information is more precise. The error during the period from 300 to 450 is lower than the error during the period 150 to 300 for the same reason. The estimation of the target position using the 2D perception information still causes errors to accumulate, but at reduced rates or levels compared to when the robotic arm is farther from the brake lever. Furthermore, each subsequent receipt of updated 3D perception information is used as a reference to reduce the target position error step-wise to a lower error than previous update 3D perception information, such that the error at time 450 is at a minimum level. In the illustrated graphs 350, 360, the robotic arm reaches the brake lever at time 500.

Figure 5:
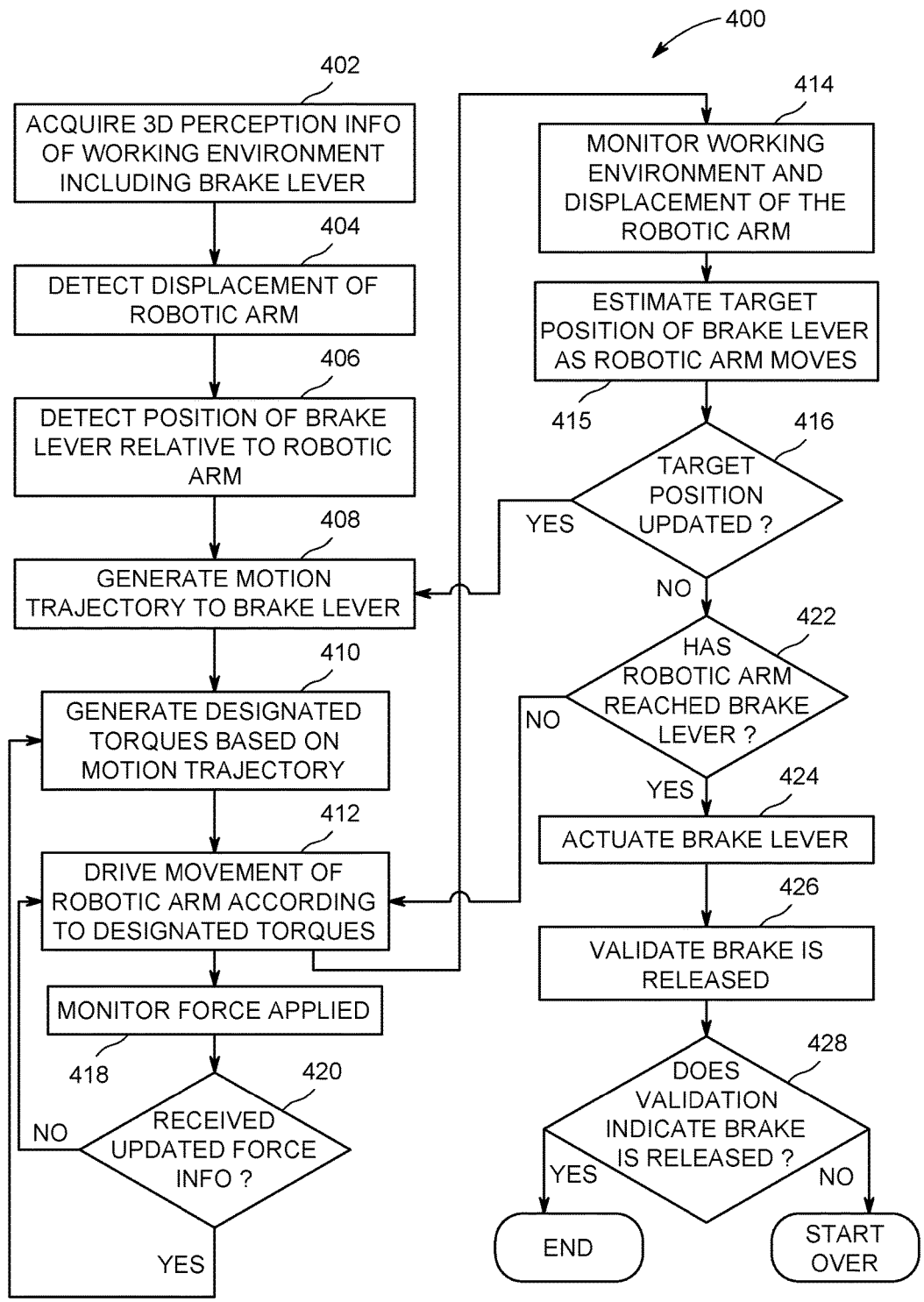
FIG. 5 is a flowchart of one embodiment of a method for automatically locating and actuating a brake lever to perform brake bleeding.

FIG. 5 illustrates a flowchart of one embodiment of a method 400 for automatically locating and actuating a brake lever to perform brake bleeding. The method 400 may be performed by one or more embodiments of the control system 102 (shown in FIG. 1) described herein to release air brakes of a vehicle. At 402, 3D perception information of a working environment is acquired. The 3D perception information is acquired by an imaging sensor (for example, laser scanner 207 shown in FIG. 2). The imaging sensor may be mounted on a robotic arm of the control system 102, such that the imaging sensor moves with the robotic arm relative to a base of the control system on which the arm is mounted. The working environment includes a brake lever that is the target for the robotic arm in order to perform the brake bleeding task. For example, the brake lever is actuatable to open valve of an air brake system of a vehicle. The imaging sensor may acquire the 3D perception information at a relatively slow acquisition rate, such as a frequency around 0.2 Hz.

At 404, displacement of the robotic arm is detected. The displacement may refer to detecting a current velocity, acceleration, and/or position of the arm. The current position may be relative to a reference position of the arm. The displacement may be detected by an encoder sensor (for example, the encoder sensor 202 shown in FIG. 2). At 406, a target position of the brake lever in the working environment is detected relative to the robotic arm. The target position of the brake lever may be detected by one or more processors using the 3D perception information of the working environment and the displacement of the arm. The one or more processors may detect the position of the brake lever by using 3D image segmentation or another image processing technique.

At 408, a motion trajectory is generated that defines a path for the robotic arm to the brake lever. The motion trajectory is generated by one or more processors. The motion trajectory may be a series of via-points between the arm and the brake lever, and the motion trajectory may include dynamics values associated with each of the via-points. The dynamics values may include desired position, velocity, and acceleration of the robotic arm at the corresponding via-points. The motion trajectory also accounts for identified obstacles in the working environment between the arm and the brake lever, such that the via-points define a path that extends around any obstacles, allowing the arm to avoid engaging such obstacles. The presence of any obstacles may be detected by analyzing the 3D perception information.

At 410, designated torques for joints of the robotic arm are generated based on the motion trajectory. The torques are generated by one or more processors. Some designated torques are directed to joints between linear segments of the robotic arm to control rotation and/or the relative angle between the linear segments. Other designated torques are directed to an end-effector that is configured to engage the brake lever to actuate the brake lever. The torques to the end-effector may control rotation of the end-effector, a width of a jaw of the end-effector for grasping the brake lever, and/or translational movement of the end-effector relative to other parts of the arm. The torques are generated such that the arm moves through the working environment according to the motion trajectory towards the brake lever while avoiding obstacles.

At 412, movement of the robotic arm is driven according to the designated torques. The movement of the arm may be driven by a controller that includes or is communicatively coupled to one or more processors. The arm is driven through the working environment to the brake lever along an approach stroke until the end-effector engages the brake lever. The controller may drive the movement of the robotic arm towards the lever at a control rate that is between 10 and 20 Hz. The arm is further driven by the torques such that the arm grasps the brake lever and pulls (or pushes) the lever to actuate the lever. The actuation of the lever releases air from the brake system to release the brakes. The arm is controlled to subsequently release the brake lever and return along a retract stroke towards the base of the robotic machine assembly.

At 418, the force applied by the robotic arm is monitored as the arm moves. The force may be monitored by a force sensor (for example, force sensor 204 shown in FIG. 2) that is operably coupled to the arm. The force sensor may monitor forces on the joints of the arm, including forces applied by the arm on the brake lever when the arm engages the brake lever. At 420, a determination is made whether updated force information has been received. For example, the force sensor may real-time, closed-loop feedback to the one or more processors indicating the forces applied by the arm. If updated force information is received, flow of the method 400 may return to 410, where at least some of the designated torques are revised based on the updated force information. The one or more processors may also use updated displacement information from the encoder sensor to revise the designated torques. For example, if the force sensor and the encoder indicate that a given torque causes the arm to move farther in an advance direction than is desired in the motion trajectory, the one or more processors may revise subsequent designated torques to compensate for this identified control error. Thus, a subsequent torque may drive the arm in a direction opposite the advance direction to bring the position of the arm back to the defined path. Feedback provided by the force sensor may also be used to validate whether the brakes have been properly released. If, however, updated force information is not received, flow of the method 400 returns to 412, and the robotic arm continues to be driven toward the brake lever according to the designated torques.

At 414, as the robotic arm is moving towards the brake lever, the working environment and the displacement of the robotic arm are both monitored. For example, the imaging sensor continues to acquire 3D perception information of the working environment that includes the brake lever therein. In an embodiment, another imaging sensor, such as a mono camera, acquires 2D perception information of the working environment at an acquisition rate that is substantially higher than the acquisition rate of the other imaging sensor. The imaging sensor that acquires 3D perception information is referred to as a 3D imaging sensor, while the imaging sensor that acquires the 2D perception information is referred to as a 2D imaging sensor. The 3D perception information is more precise (e.g., more accurate, higher clarity, etc.) than the 2D perception information. As the robotic arm gets closer to the brake lever, the perception information acquired by both of the imaging sensors provides a more detailed view of the brake lever compared to perception information acquired when the imaging system was farther away from the brake lever. Similarly, the encoder continues to detect the displacement of the robotic arm as the robotic arm moves towards the brake lever. The perception information and the displacement information are both communicated to one or more processors.

At 415, the target position of the brake lever is estimated as the robotic arm moves. The target position of the brake lever is estimated using a two-stage predict and then correct sequence. In the predict stage, the one or more processors receive multiple inputs, including displacement data of the robotic arm from the encoder sensor and 2D perception information acquired by the 2D imaging sensor (e.g., a mono camera or the like) as the robotic arm moves towards the brake lever. The one or more processors generate a predicted target position of the brake lever by using an optical flow-based prediction model. The one or more processors also may consider other inputs, such as error and uncertainty values, when generating the predicted target position. For example, subsequently-acquired 2D perception information may be afforded more weight than prior 2D perception information because the subsequent data may be more accurate since it is acquired when the imaging sensor is closer to the brake lever. The predicted target position is an input variable that may be used in control calculations for generating the torques that drive the movement of the robotic arm. The second stage of the two-stage sequence, referred to as the correct stage, occurs when the one or more processors receive update 3D perception information during movement of the robotic arm. In the correct stage, a target position calculated using the 3D perception information is used as a reference by which to compare the predicted target position from the predict stage. The target position calculated using the 3D perception information is more precise than the predicted target position, but the 3D perception information is updated at a frequency that is too low to synchronize the perception aspect of the control system 102 with the control aspect of the control system 102 using the 3D perception information alone. Thus, in order to provide continuous feedback at a sufficiently high rate, the target position of the brake lever is predicted in the periods between receipt of updated 3D perception information.

At 416, a determination is made whether the target position has been updated. For example, the target position is updated when the estimated target position changes as the robotic arm advances towards the brake lever. If the target position has been updated, flow of the method 400 returns to 408 for a revised motion trajectory to be generated based on the updated information. Detection error is the difference between the estimated location of the brake lever using the perception information and the actual location of the brake lever. The revised motion trajectory has a reduced detection error relative to the original motion trajectory because the updated perception information used to generate the revised motion trajectory is more accurate due to the increased proximity of the imaging sensor to the brake lever during acquisition of the updated perception information. Thus, the control system 102 includes closed-loop feedback for perception information that improves the accuracy of the control system 102.

After generating the revised motion trajectory, flow may continue through the described steps. For example, revised torques may be generated based on the revised motion trajectory, and these torques are used to drive the movement of the robotic arm during further movement of the arm towards the brake lever. The control system 102 may receive updated perception information and updated displacement information multiple times as the arm moves toward the brake lever. The motion trajectory may be revised multiple times, but the motion trajectory is not revised with the same frequency that the perception information is acquired. For example, to reduce unnecessary processing, the motion trajectory may be revised between one and five times during a single extension of the arm to a brake lever. If, however, the target position is not updated, the flow of the method 400 may continue to 422, where a determination is made as to whether the robotic arm has reached the brake lever. If the robotic arm has not reached the brake lever yet, flow of the method 400 may return to 412 and the robotic arm may continue to be driven according to the designated torques towards the brake lever. If, on the other hand, the robotic arm has reached the brake lever, flow proceeds to 424.

At 424, the brake lever is actuated. The actuation of the brake lever may involve a series of defined movements of the robotic arm, including grasping the brake lever between the fingers 220 (shown in FIG. 2) of the end-effector 214 (FIG. 2), rotating and/or translating the brake lever, optionally returning the brake lever to a starting position, and then releasing the brake lever. At 426, the brake release is validated. Brake release validation includes verifying that the valve of the air brake system has been sufficiently opened such that a sufficient amount of air has been released from the brake system to allow the brakes to move to a released state. Validation may be accomplished by various methods, including audibly recording the release of air, detecting movement of the brakes to the release state, monitoring a pressure in a conduit of the brake system, using the encoder to detect that the arm has moved the lever to a designated location, using the force sensor to detect the force exerted on the lever, and the like. For example, a given type of brake lever (identified by manufacturer, size, product number, etc.) may be associated with a range of forces to actuate the lever. During the brake release process, if the force sensor records that the brake lever moves in response to a force that is within the range, this is an indication that the brake is released. If, on the other hand, the force sensor indicates that the brake lever has not moved upon receiving a force at the top of the range, this is an indication that the brake is not released and/or the robotic arm is not accurately positioned relative to the brake lever. For example, the end-effector 214 may have grasped the wrong part of the brake lever or the wrong lever entirely.

At 428, a determination is made whether the validation indicates that the brake has been released. If the validation indicates that the brake has been released, flow of the method 400 ends. For example, the robotic arm may be moved to another vehicle to perform the brake bleeding task again. If instead the validation indicates that the brake has not been released properly, flow of the method 400 may start over, returning to 402 to acquire new three-dimensional perception information of the working environment. Optionally, the control system 102 may provide an alert or notification to an operator or system. The control system 102 may send the alert right away or after another failed attempt to bleed the brakes of the vehicle.

In an embodiment, a system includes a machine assembly, a first imaging sensor, an encoder, and one or more processors. The machine assembly is movable to actuate a brake lever of a vehicle in order to open a valve of an air brake system of the vehicle. The first imaging sensor is positioned to acquire two-dimensional perception information of a working environment that includes the brake lever. The first imaging sensor is configured to acquire the two-dimensional perception information during movement of the machine assembly towards the brake lever. The encoder detects a displacement of the machine assembly relative to a reference position of the machine assembly. The displacement includes at least one of position information or motion information of the machine assembly during movement of the machine assembly towards the brake lever. The one or more processors are configured to estimate a target position of the brake lever relative to the machine assembly as the machine assembly moves toward the brake lever based on the two-dimensional perception information and the displacement of the machine assembly. The one or more processors are further configured to drive the movement of the machine assembly towards the target position of the brake lever.

Optionally, the machine assembly includes a moveable arm that has an end-effector disposed at a distal end of the movable arm. The end-effector grasps the brake lever to actuate the brake lever. The first imaging sensor is mounted on the movable arm at least one of on or proximate to the end-effector.

Optionally, the machine assembly includes a moveable arm and the first imaging sensor is mounted on the movable arm. The one or more processors are configured to estimate the target position of the brake lever relative to the machine assembly as the movable arm of the machine assembly moves by using optical flow-based analysis on a sequence of two-dimensional images of the brake lever acquired by the first imaging sensor from different positions of the first imaging sensor relative to the brake lever.

Optionally, the machine assembly includes a moveable arm and the first imaging sensor is mounted on the movable arm. The system further includes a second imaging sensor that is configured to acquire three-dimensional perception information of the working environment. The three-dimensional perception information acquired by the second imaging sensor is more precise than the two-dimensional perception information acquired by the first imaging sensor. The three-dimensional perception information is acquired at an acquisition rate that is slower than an acquisition rate of the two-dimensional perception information.

Optionally, the one or more processors are configured to estimate the target position of the brake lever during movement of the movable arm based on the three-dimensional perception information in response to receipt of updated three-dimensional perception information. The one or more processors are configured to estimate the target position of the brake lever during movement of the movable aim based on the two-dimensional perception information and the displacement of the movable arm in response to a lack of receipt of updated three-dimensional perception information.

Optionally, the first and second imaging sensors are both mounted on the movable arm.

Optionally, the first imaging sensor is a mono camera and the second imaging sensor is a laser scanner.

Optionally, the one or more processors are further configured to generate a motion trajectory for the machine assembly that provides a path from the machine assembly to the position of the brake lever. The motion trajectory is configured to avoid obstacles located between the machine assembly and the brake lever.

Optionally, the one or more processors generate the motion trajectory as a series of via-points between the machine assembly and the brake lever. The motion trajectory includes dynamics values for position, velocity, and acceleration of the machine assembly associated with each via-point. The one or more processors are configured to drive the machine assembly through the via-points with the dynamics values at each corresponding via-point.

Optionally, a force sensor is operably coupled to the machine assembly. The force sensor detects one or more forces generated by the machine assembly as the machine assembly actuates the brake lever.

Optionally, the machine assembly includes a movable arm having multiple joints. The one or more processors are configured to generate designated torques for corresponding joints of the arm. The one or more processors drive the arm of the machine assembly according to the designated torques.

In another embodiment, a method includes acquiring perception information of a brake lever of a vehicle to detect a target position of the brake lever relative to a robotic arm of a machine assembly. The brake lever is actuatable to open a valve of an air brake system of the vehicle. The perception information is acquired by a first imaging sensor mounted on the robotic arm. The method includes driving the robotic arm towards the target position of the brake lever to actuate the brake lever for opening the valve of the air brake system. The method also includes detecting a displacement of the robotic arm as the robotic arm moves towards the target position. The displacement information includes at least one of position information or motion information of the robotic arm. The method further includes estimating, using one or more processors, an updated target position of the brake lever based at least in part on the perception information acquired during the movement of the robotic arm and the displacement information of the robotic arm.

Optionally, the first imaging sensor is a mono camera and the perception information is two-dimensional images of the brake lever. The updated target position is estimated by analyzing a sequence of the two-dimensional images of the brake lever acquired by the mono camera at different positions of the mono camera relative to the brake lever as the robotic arm moves towards the target position.

Optionally, the perception information is two-dimensional perception information acquired by the first imaging sensor. The method further includes acquiring three-dimensional perception information of the brake lever from a second imaging sensor. The three-dimensional perception information is more precise than the two-dimensional perception information. The three-dimensional perception information is acquired at a slower acquisition rate than the two-dimensional perception information.

Optionally, a first updated target position is estimated based on the three-dimensional perception information acquired by the second imaging sensor responsive to receipt of updated three-dimensional perception information. A subsequent second updated target position is estimated based on both the two-dimensional perception information acquired by the first imaging sensor and the displacement of the movable arm responsive to a lack of receipt of updated three-dimensional perception information.

Optionally, the method also includes mounting the first and second imaging sensors on the robotic arm of the machine assembly.

Optionally, the first imaging sensor is a mono camera and the second imaging sensor is a laser scanner.

Optionally, the method further includes revising, using the one or more processors, a motion trajectory for the robotic arm based on the updated target position of the brake lever that is estimated during movement of the robotic arm. The motion trajectory includes a series of via-points that form a path for the robotic arm to move along towards the brake lever while avoiding identified obstacles.

Optionally, the method also includes generating, using the one or more processors, designated torques for the robotic arm at corresponding via-points based on the motion trajectory. The designated torques are used to drive the robotic arm towards the target position of the brake lever to actuate the brake lever.

Optionally, the method further includes receiving force generation information from a force sensor as the robotic arm moves towards the brake lever, and revising the designated torques based on the force generation information that is received.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
    a machine assembly that is movable to actuate a brake lever of a vehicle in order to open a valve of an air brake system of the vehicle;
    a first imaging sensor positioned to acquire two-dimensional perception information of a working environment that includes the brake lever, the first imaging sensor configured to acquire the two-dimensional perception information during movement of the machine assembly towards the brake lever;
an encoder detecting a displacement of the machine assembly relative to a reference position of a robotic arm of the machine assembly, the displacement including at least one of position information or motion information of the machine assembly during movement of the machine assembly towards the brake lever; and
one or more processors configured to estimate a target position of the brake lever relative to the machine assembly as the machine assembly moves toward the brake lever based on the two-dimensional perception information and the displacement of the machine assembly, the one or more processors further configured to drive the movement of the machine assembly towards the target position of the brake lever,
wherein the machine assembly includes a moveable arm and the first imaging sensor is mounted on the movable arm, the system further comprising a second imaging sensor that is configured to acquire three-dimensional perception information of the working environment, the three-dimensional perception information acquired by the second imaging sensor being more precise than the two-dimensional perception information acquired by the first imaging sensor, the three-dimensional perception information being acquired at an acquisition rate that is slower than an acquisition rate of the two-dimensional perception information.

2. The system of claim 1, wherein the machine assembly includes a moveable arm that has an end-effector disposed at a distal end of the movable arm, the end-effector grasping the brake lever to actuate the brake lever, the first imaging sensor being mounted on the movable arm at least one of on or proximate to the end-effector.

3. The system of claim 1, wherein the machine assembly includes a moveable arm and the first imaging sensor is mounted on the movable arm, the one or more processors are configured to estimate the target position of the brake lever relative to the machine assembly as the movable arm of the machine assembly moves by using optical flow-based analysis on a sequence of two-dimensional images of the brake lever acquired by the first imaging sensor from different positions of the first imaging sensor relative to the brake lever.

4. The system of claim 1, wherein the one or more processors are configured to estimate the target position of the brake lever during movement of the movable arm based on the three-dimensional perception information in response to receipt of updated three-dimensional perception information, and the one or more processors are configured to estimate the target position of the brake lever during movement of the movable arm based on the two-dimensional perception information and the displacement of the movable arm in response to a lack of receipt of updated three-dimensional perception information.

5. The system of claim 1, wherein the first and second imaging sensors are both mounted on the movable arm.

6. The system of claim 1, wherein the first imaging sensor is a mono camera and the second imaging sensor is a laser scanner.

7. The system of claim 1, wherein the one or more processors are further configured to generate a motion trajectory for the machine assembly that provides a path from the machine assembly to the position of the brake lever, the motion trajectory configured to avoid obstacles located between the machine assembly and the brake lever.

8. The system of claim 7, wherein the one or more processors generate the motion trajectory as a series of via-points between the machine assembly and the brake lever, the motion trajectory including dynamics values for position, velocity, and acceleration of the machine assembly associated with each via-point, the one or more processors configured to drive the machine assembly through the via-points with the dynamics values at each corresponding via-point.

9. The system of claim 1, further comprising a force sensor operably coupled to the machine assembly, the force sensor configured to detect one or more forces generated by the machine assembly as the machine assembly actuates the brake lever.

10. The system of claim 1, wherein the machine assembly includes a movable arm having multiple joints, the one or more processors being configured to generate designated torques for corresponding joints of the arm, the one or more processors driving the arm of the machine assembly according to the designated torques.

11. A method comprising:
acquiring perception information of a brake lever of a vehicle to detect a target position of the brake lever relative to a robotic arm of a machine assembly, the brake lever being actuatable to open a valve of an air brake system of the vehicle, the perception information being acquired by a first imaging sensor mounted on the robotic arm;
driving the robotic arm towards the target position of the brake lever to actuate the brake lever for opening the valve of the air brake system
detecting a displacement of the robotic arm as the robotic arm moves towards the target position, the displacement information including at least one of position information or motion information of the robotic arm; and
estimating, using one or more processors, an updated target position of the brake lever based at least in part on the perception information acquired during the movement of the robotic arm and the displacement information of the robotic arm,
wherein the perception information is two-dimensional perception information acquired by the first imaging sensor and the method further includes acquiring three-dimensional perception information of the brake lever from a second imaging sensor, the three-dimensional perception information being more precise than the two-dimensional perception information, the three-dimensional perception information being acquired at a slower acquisition rate than the two-dimensional perception information.

12. The method of claim 11, wherein the first imaging sensor is a mono camera and the perception information is two-dimensional images of the brake lever, the updated target position being estimated by analyzing a sequence of the two-dimensional images of the brake lever acquired by the mono camera at different positions of the mono camera relative to the brake lever as the robotic arm moves towards the target position.

13. The method of claim 11, wherein a first updated target position is estimated based on the three-dimensional perception information acquired by the second imaging sensor responsive to receipt of updated three-dimensional perception information, and a subsequent second updated target position is estimated based on both the two-dimensional perception information acquired by the first imaging sensor and the displacement of the movable arm responsive to a lack of receipt of updated three-dimensional perception information.

14. The method of claim 11, further comprising mounting the first and second imaging sensors on the robotic arm of the machine assembly.

15. The method of claim 11, wherein the first imaging sensor is a mono camera and the second imaging sensor is a laser scanner.

16. The method of claim 11, further comprising revising, using the one or more processors, a motion trajectory for the robotic arm based on the updated target position of the brake lever that is estimated during movement of the robotic arm, the motion trajectory including a series of via-points that form a path for the robotic arm to move along towards the brake lever while avoiding identified obstacles.

17. The method of claim 16, further comprising generating, using the one or more processors, designated torques for the robotic arm at corresponding via-points based on the motion trajectory, the designated torques being used to drive the robotic arm towards the target position of the brake lever to actuate the brake lever.

18. The method of claim 17, further comprising receiving force generation information from a force sensor as the robotic arm moves towards the brake lever, and revising the designated torques based on the force generation information that is received.

* * * * *